Figure 5:
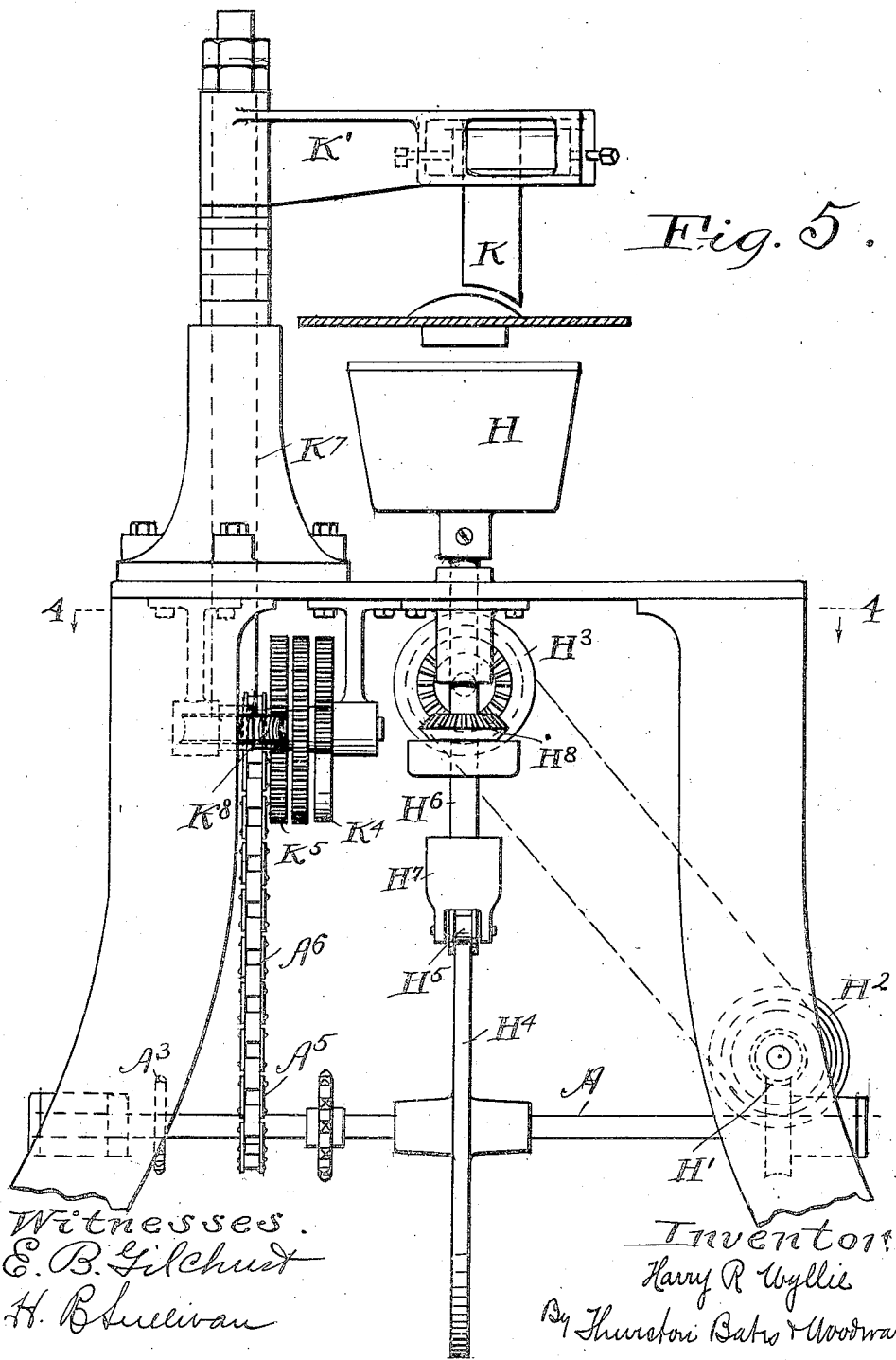

No. 836,169. PATENTED NOV. 20, 1906.
H. R. WYLLIE.
APPARATUS FOR MAKING SAUCERS AND SIMILAR ARTICLES.
APPLICATION FILED NOV. 16, 1905.
6 SHEETS—SHEET 1.
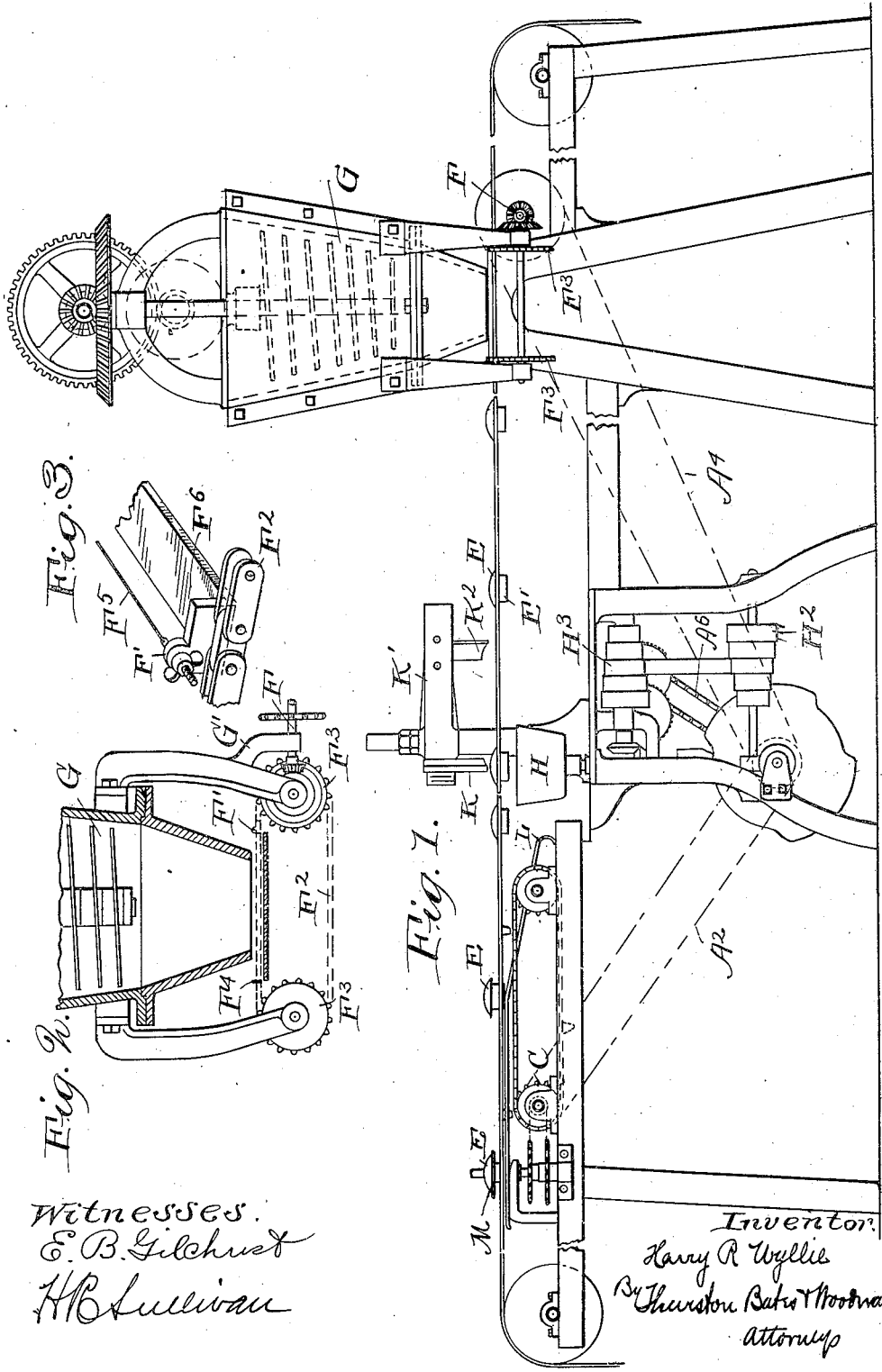
Witnesses
E. B. Gilchrist
H. C. Sullivan
Inventor
Harry R. Wyllie
By Thurston Bates & Woodward
Attorneys No. 836,169.  
PATENTED NOV. 20, 1906.
H. R. WYLLIE.
APPARATUS FOR MAKING SAUCERS AND SIMILAR ARTICLES.
APPLICATION FILED NOV. 16, 1905.
6 SHEETS—SHEET 2.
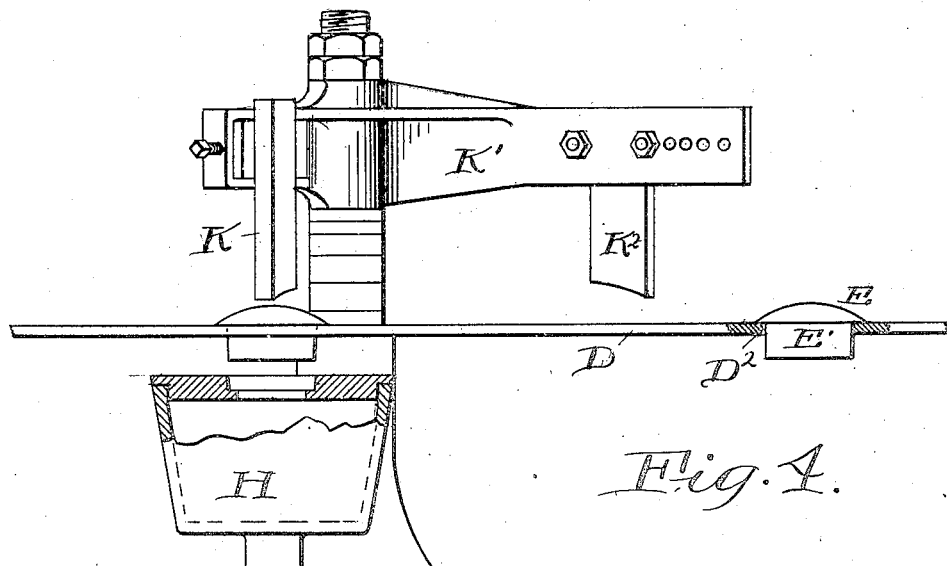
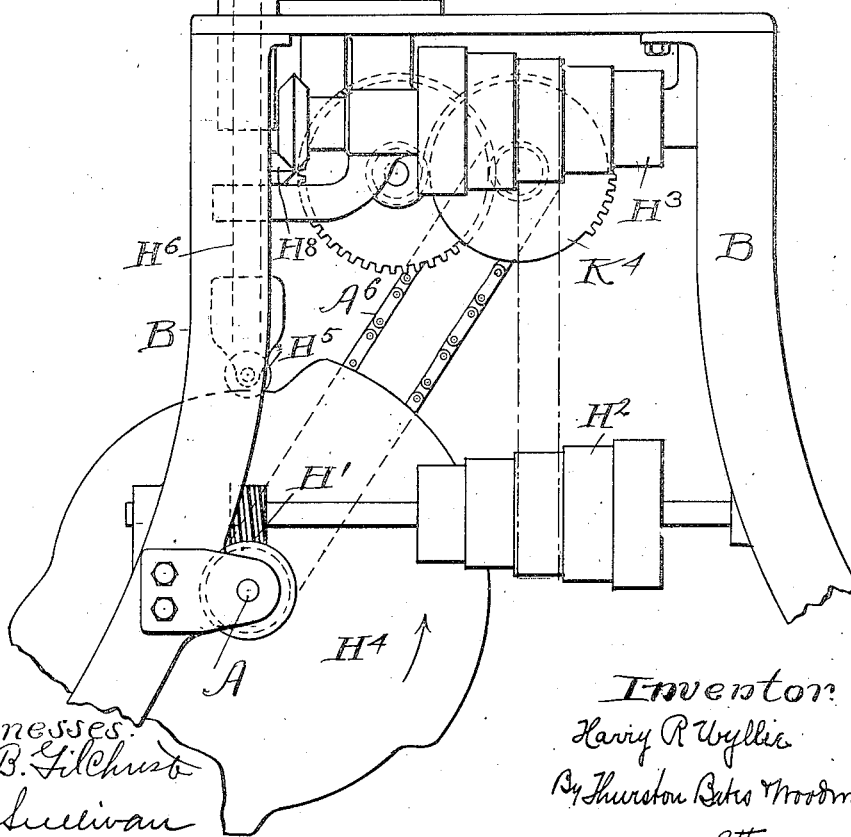
Fig. 4.

No. 836,169. PATENTED NOV. 20, 1906.
H. R. WYLLIE.
APPARATUS FOR MAKING SAUCERS AND SIMILAR ARTICLES.
APPLICATION FILED NOV. 16, 1905.

6 SHEETS—SHEET 3.

Witnesses.
E. B. Gilchrist
H. B. Sullivan

Inventor:
Harry R. Wyllie
By Thurston Bates & Woodward
Attorneys

No. 836,169. PATENTED NOV. 20, 1906.
H. R. WYLLIE.
APPARATUS FOR MAKING SAUCERS AND SIMILAR ARTICLES.
APPLICATION FILED NOV. 16, 1905.

6 SHEETS—SHEET 4.

Witnesses.
E. B. Gilchrist
H. Sullivan

Inventor
Harry R. Wyllie
By
Thurston Bates Woodward
Attorney

No. 836,169. PATENTED NOV. 20, 1906.
H. R. WYLLIE.
APPARATUS FOR MAKING SAUCERS AND SIMILAR ARTICLES.
APPLICATION FILED NOV. 16, 1905.
6 SHEETS—SHEET 5.
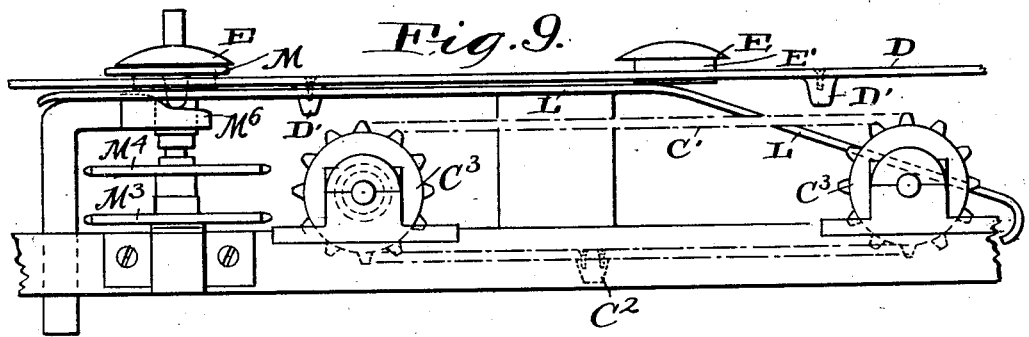
Fig. 9.
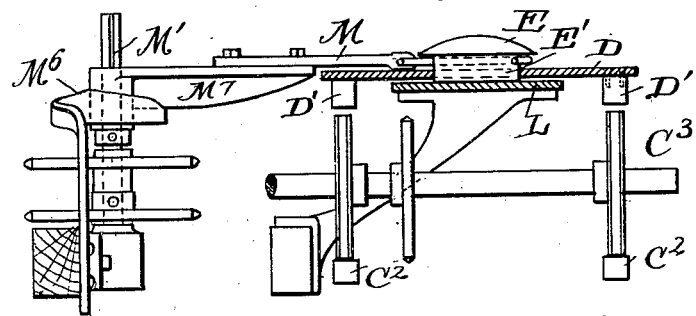
Fig. 10.
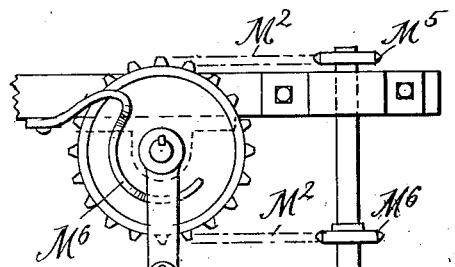
Fig. 8.
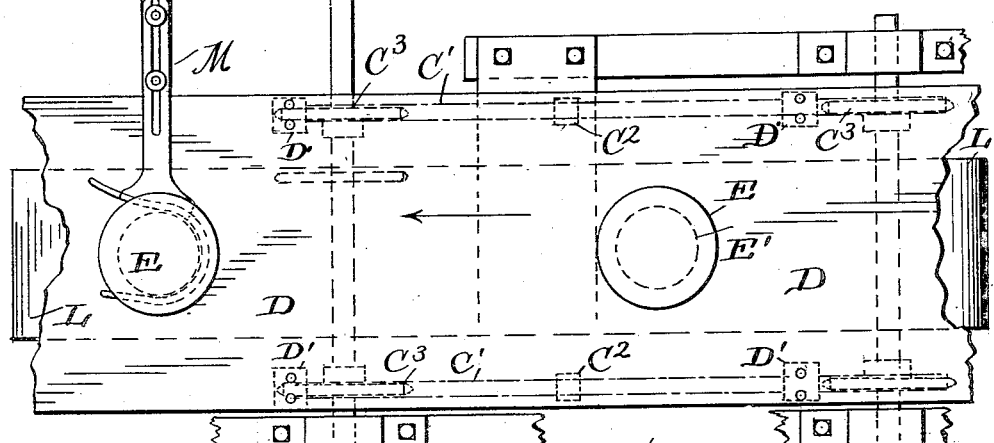

No. 836,169. PATENTED NOV. 20, 1906.
H. R. WYLLIE.
APPARATUS FOR MAKING SAUCERS AND SIMILAR ARTICLES.
APPLICATION FILED NOV. 16, 1905.
6 SHEETS—SHEET 6.

Witnesses
E. B. Gilchrist
H. P. Sullivan

Inventor
Harry R. Wyllie
By Thurston Bates & Woodward
Attorneys

UNITED STATES PATENT OFFICE.

HARRY R. WYLLIE, OF KITTANNING, PENNSYLVANIA.

APPARATUS FOR MAKING SAUCERS AND SIMILAR ARTICLES.

No. 836,169.  Specification of Letters Patent.  Patented Nov. 20, 1906.

Application filed November 16, 1905. Serial No. 287,689.

*To all whom it may concern:*

Be it known that I, HARRY R. WYLLIE, a citizen of the United States, residing at Kittanning, in the county of Armstrong and State of Pennsylvania, have invented a certain new and useful Improvement in Apparatus for Making Saucers and Similar Articles, of which the following is a full, clear, and exact description, reference being had to the accompanying drawings.

The object of the present invention is to provide a complete machine designed to mold and form saucers, plates, and other similar articles made of plastic material and deliver the same to a carrier arranged to convey them to the dry-room or other destination in regular order.

Heretofore the work of molding and forming plastic articles of this nature has been performed by hand and with the aid of several unconnected independently-operated mechanisms. My purpose has been to provide a machine which shall automatically perform several operations hitherto accomplished by hand and to embody in a single machine sufficient coöperating parts to make it possible to dispense with several of the independent mechanisms which have hitherto been used for producing such articles. The automatic operation of a machine of this sort enables the manufacturer to dispense with several operators, resulting in considerable economy and a more uniform product. These and many other advantages will appear from the detailed description given below.

Figure 6:
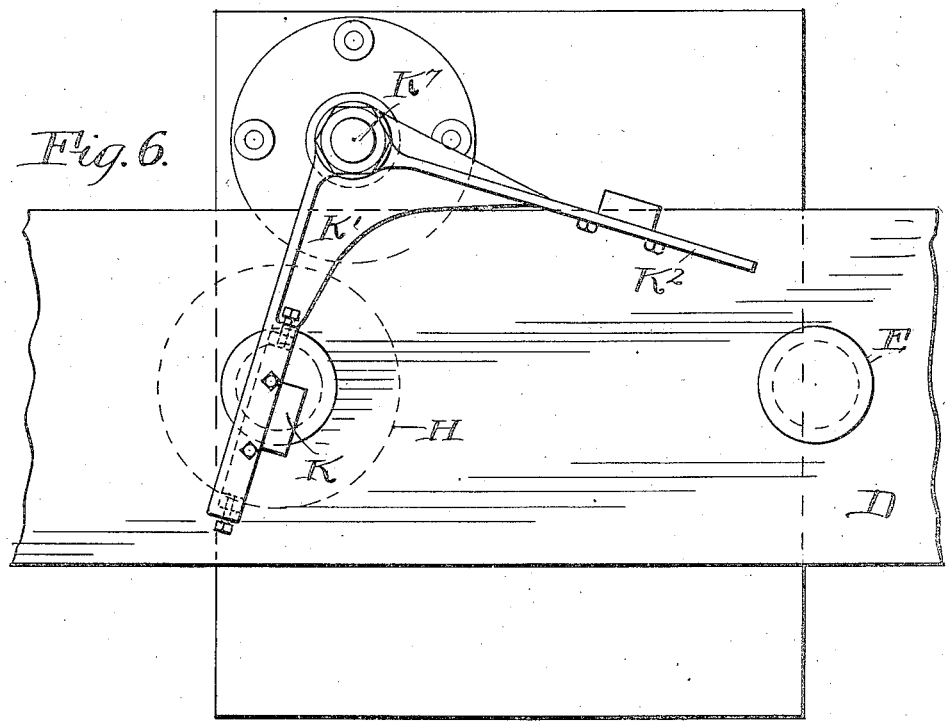
Figure 7:
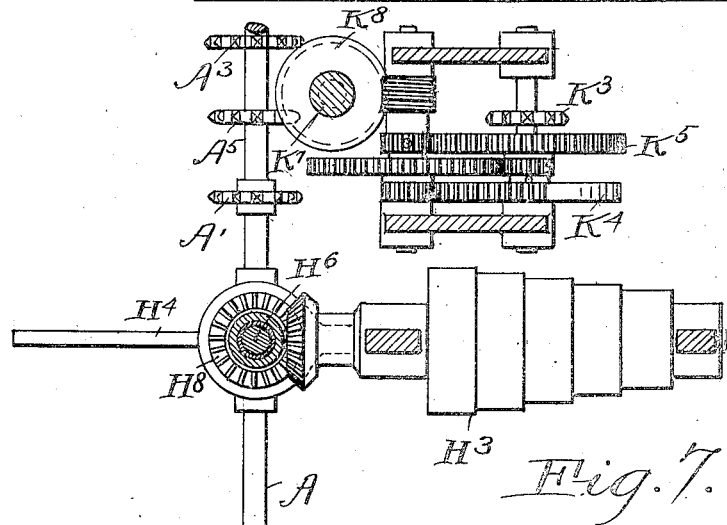
Figure 11:
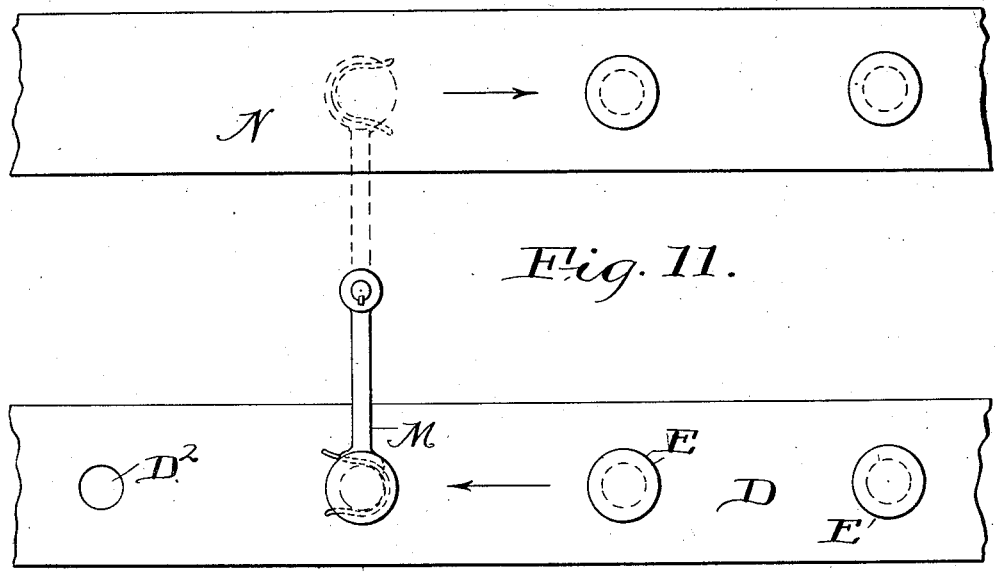
Figure 12:
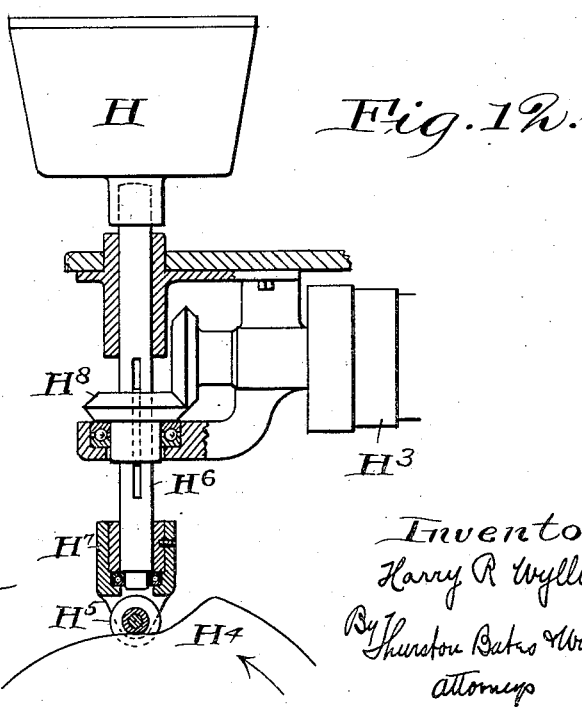

Referring to the drawings, Figure 1 is a front elevation of my machine, the carrying-belt and framework being broken away at certain points for the purpose of condensing the illustration. Fig. 2 is a vertical cross-sectional detail illustrating the arrangement of the slicer operating under the delivery end of the pug-mill. Fig. 3 is a detail perspective broken away, illustrating the end structure of the slicer. Fig. 4 is an enlarged front elevation broken away in parts, showing the connections for operating the rotating potters' wheel. Fig. 5 is a cross-section of the apparatus looking from the left hand in Fig. 4. Fig. 6 is an enlarged detail plan looking down upon the swinging arms carrying the roughing and finishing blades. Fig. 7 is a horizontal cross-section taken on the line 7 7 of Fig. 5, the framework being omitted for the sake of clearness of illustration. Fig. 8 is a plan broken away at each end, illustrating in detail the carrying-arm designed to lift the forms carrying the molded articles from the belt of the molding-machine and effecting their transfer to a similar belt traveling to the dry-room or other desired destination. Fig. 9 is a front elevation of that portion of the mechanism shown in plan of Fig. 8. Fig. 10 is a vertical cross-section taken at the left hand of Fig. 8. Fig. 11 is a diagrammatic plan showing the operation of the carrier-arm in transferring the mold-forms carrying the finished articles to the dry-room belt. Fig. 12 is a vertical sectional detail showing the structure whereby the potters' wheel is vertically reciprocated and simultaneously rotated.

Referring to Figs. 1 and 7, it will be seen that the main cross-shaft A, which is journaled in the side of the frame B, carries the various worm and sprocket wheels which operate the several mechanisms. This main shaft may be driven in any suitable manner, either through immediate connection with the power-shaft of the factory or by any other suitable and convenient method.

One of the sprocket-wheels $A'$, fixed to and rotatable with the main shaft, serves, through a chain connection $A^2$, to drive the belt-advancing mechanism C. (Shown in detail in Figs. 8, 9, and 10.) Such advancing mechanism consists of a pair of endless chains $C'$ $C'$, passing over pairs of sprocket-wheels $C^3$ $C^3$, suitably journaled in the bed-frame. These chains each carry a projection $C^2$, adapted to engage projections $D'$, depending from the lower side of the carrying-belt D, and thereby advance the latter a certain distance. Owing to the spacing of these projections on the belt, it is advanced intermittently, the distance being determined so as to bring the mold-pieces E, carrying the material under treatment, to the proper place at the proper time for the operation of the various submechanisms.

Fixed to the main cross-shaft and rotated therewith is a second sprocket $A^3$, which through chain connection $A^4$ drives a short shaft F, journaled in a bracket $G'$, depending from a pug-mill G, located above the carrying-belt. The short shaft F referred to, through a bevel-gear connection, as shown in Figs. 1 and 2, operates a slicing device F', which is mounted beneath the delivery end of the pug-mill. This slicing device comprises a pair of endless chains or belts $F^2$ $F^2$, which are spaced apart and are carried by wheels $F^3$ $F^3$, journaled in suitable brackets depending from the mill-hopper. Extending between these two endless belts is a smoothing-knife $F^4$, which is designed to pass over and smooth off the bottom surface of the clay at the mouth of the mill. Also extending between the two endless chains is a slicing-wire $F^5$, stretched in a supporting-bracket $F^6$ and spaced a proper distance behind the smoothing-knife.

The operation of the slicer is, through the proper adjustment of gear, synchronized so that a disk of clay is dropped upon the carrying-belt at regular successive points, which are separated from each other by a distance equal to that of the advancement of the carrying-belt by the intermittently-operating mechanism previously described. The carrying-belt is provided with perforations $D^2$, in which are carried mold-pieces E, and the apparatus is so arranged that the disks of clay fall upon these mold-forms when sliced from the stock in the pug-mill. Each mold-form has a depending stem E', projecting through the belt and adapted to be caught and engaged by a revolving potter's wheel H, located beneath the carrying-belt.

Referring to Figs. 4, 7, and 12, it will be seen that the motion from the main cross-shaft A to the revolving wheel H is obtained through a worm-gearing and a set of stepped pulleys $H^2$ $H^3$, which latter admit of any desired rate of rotation being transmitted. The revolving wheel H is loosely mounted in a vertical journal-box carried by the bed-plate and is adapted to be raised and lowered vertically therethrough by a cam $H^4$, secured to the main cross-shaft A and operating against an antifriction-roller $H^5$, secured to a cup $H^7$ at the lower end of the shaft $H^6$ of the revolving wheel. Simultaneous rotation and reciprocation is permitted by reason of a feather-and-groove connection existing between rotating gear $H^8$ and the shaft $H^6$, as seen in Fig. 12.

The cam $H^4$ is of such contour and is so arranged upon the shaft A that during the intervals of rest of the carrying-belt the revolving wheel H is elevated until it engages the stem E' of the mold-forms E, carrying the clay disk, which by the proper arrangement of parts is during the interval of rest immediately above the said revolving wheel. The engagement of the revolving wheel with the mold-form lifts the latter slightly, so as to clear the carrying-belt, and rotates it in such manner that the clay is shaped and smoothed by a roughing-blade K, which depends from a spider K', projecting over the belt. While the carrying-belt is still at rest the revolving cam $H^4$ continues its rotation and after an interval permits the revolving wheel H to drop in order that the roughing-blade may be swung out of the way and a finishing-blade $K^2$ brought into position by mechanism to be described below. When the finishing-blade has been brought into position, the cam again raises the revolving wheel and rotates, so that the latter will engage the stem of the mold-form and rotate it beneath said finishing-blade for a given interval of time, after which interval the cam again permits the revolving wheel to drop away from and out of engagement with the mold-form, thereby permitting the unobstructed advancement of the carrying-belt, which takes place at this time.

The rotation of the spider carrying the roughing and finishing blades is effected by means of a sprocket $A^5$, attached to the main cross-shaft and connected by a chain $A^6$ with a sprocket $K^3$ to a short shaft journaled in the bed-frame. Through a broken gear-wheel $K^4$ and a system of step-up gears $K^5$, which are properly journaled either fast or loose upon the short shaft referred to and on an adjacent shaft carrying a worm $K^7$, meshing with a worm-wheel $K^8$ on the vertical shaft $K^7$, to which the said spider is secured, a suitable and synchronous movement is transmitted from the main cross-shaft A, so that the respective shaping-blades are brought into position at the proper interval—that is to say, when the revolving wheel is elevated by the cam, as described above.

As the belt is advanced the mold-forms carrying the finished article pass over an elevating-platform L, which is so positioned as to engage the lower ends of the stems $E^2$ of said mold-forms and lift the latter clear of the carrying-belt, so that a transfer-carrying-arm M may slip thereunder. The transfer-arm M referred to is connected by a feather and groove to a vertical shaft M', journaled in the framework of the machine, which shaft is properly rotated by means of an endless chain $M^2$, passing over fixed and idle sprocket-wheels $M^3$ $M^4$ on said shaft and fixed and idle sprocket-wheels $M^5$ $M^6$ on a prolongation of the shaft which drives the advancing mechanism, as will be seen by reference to Fig. 8. The rotation of the transfer-arm is so timed that it will pass beneath the mold-form and advance with the latter during the motion of the carrier-belt. As the transfer-arm advances, however, it is caused to rise upwardly by reason of a cam $M^6$, bearing against a web $M^7$, projecting from the under side of the arm, with the result that the mold-piece bearing the shaped clay is lifted clear of the carrier-belt and swung toward the dry-room belt N, which is adjacent thereto and traveling in an opposite direction. As the transfer-arm comes over the dry-room belt it slides off of the elevating-cam $M^6$ and drops the mold onto said dry-room belt, which belt travels somewhat faster than the rotating arm and removes the mold-form therefrom, the arm subsequently continuing its uninterrupted revolution.

In the drawings I have not illustrated the return-section of the carrier-belt D, as it is unnecessary for the purpose of understanding the operation of the machine, it being plain that the belt may be passed under the machine and back thereover in any convenient manner. It is merely necessary to provide a retaining-web or similar device for preventing the mold-forms from dropping out of the holes in the belt.

While I have described the main crossshaft as the operating-shaft of my mechanism, it is plain that most any one of several of the shafts in the system may be used as the power-shaft when the parts are of proper strength and construction. It will be seen that the operation of the mechanism is entirely automatic and capable of the most exact work, since the sprocket and chain or gear connection used throughout insures mathematical accuracy in the timing of the various operations. At no point between the pug-mill and the dry-room belt is it necessary for an attendant to concern himself with the operation of the apparatus.

It is manifest that many modifications of the machine may be made in the matter of connections and design of the parts without departing from the spirit or character of my invention.

Having thus described my invention, I claim—

1. The combination of a horizontal conveyer-belt having a plurality of holes through it, molds upon said belt provided with stems which extend through said holes and are rotatable therein, a horizontal rotatable wheel which is normally below the plane of the lower ends of said mold-stems but is vertically movable upward such a distance that it engages with a mold-stem and lifts its mold clear of the conveyer-belt, mechanism for moving said wheel vertically, mechanism for rotating it, and mechanism for moving the conveyer-belt intermittently to bring the molds severally over said wheels.

2. The combination of a conveyer-belt, molds rotatably supported upon said belt, mechanism for moving said belt intermittently, a horizontal vertically-movable wheel below said belt, mechanism for rotating said wheel, mechanism for raising it, a spider rotatable upon a vertical axis, two shaping-tools fixed thereto, and mechanism for turning said spider intermittently the angular distance between said tools at times when said horizontal wheel is down.

3. The combination of a horizontal conveyer-belt having cylindrical holes through it, molds removably supported upon said belt and having cylindrical stems which extend through said holes, mechanism for moving said belt intermittently, mechanism for lifting the molds clear of the belt and for rotating them while the belt is stationary, a shaping-tool which is above the rotating mold and is stationary while the mold is rotating.

4. The combination of a horizontal conveyer-belt having cylindrical holes through it, molds removably supported upon said belt and having cylindrical stems which extend through said holes, mechanism for moving said belt intermittently, mechanism for lifting the molds clear of the belt and for rotating them while the belt is stationary, a shaping-tool which is above the rotating mold and is stationary while the mold is rotating, and a transfer device which lifts the molds free of the belt and moves them over another support and deposits them thereon.

5. The combination of a horizontal conveyer-belt having cylindrical holes through it, molds removably supported upon said belt and having cylindrical stems which extend through said holes, mechanism for moving said belt intermittently, mechanism for lifting the molds clear of the belt and for rotating them while the belt is stationary, a shaping-tool which is above the rotating mold and is stationary while the mold is rotating, a device for subsequently lifting the molds above the belt, and a swinging arm capable of swinging over the belt and beneath the molds, and mechanism for slightly raising said arm and for swinging it around over another support and for then slightly lowering it.

6. The combination of a horizontal conveyer-belt having cylindrical holes through it, molds removably supported upon said belt and having cylindrical stems which extend through said holes, mechanism for moving said belt intermittently, mechanism for lifting the molds clear of the belt and for rotating them while the belt is stationary, a shaping-tool which is above the rotating mold and is stationary while the mold is rotating, a hook-shaped arm adapted to be swung on a vertical axis over said belt, mechanism for so swinging it, and a cam on which said arm rests in so swinging.

7. The combination of a horizontal conveyer-belt having cylindrical holes through it, molds removably supported upon said belt and having cylindrical stems which extend through said holes, mechanism for moving said belt intermittently, an inclined platform beneath the belt for lifting the molds clear of the belt, and a transfer device which engages with the molds when so lifted, mechanism for slightly raising said transfer device to raise the mold-stems from the belt, and mechanism for swinging said transfer device free of the belt.

8. The combination of a horizontal conveyer-belt having a plurality of equally-spaced cylindrical holes through it, mechanism for moving said belt at regular intervals distances equal to the distances between the centers of said holes, absorbent removably-sustained molds upon said belt and having cylindrical stems which extend through said holes, a pug-mill having its discharge-spout over and close to said belt, mechanism for slicing a disk of clay from the column thereof in said discharge-spout when the belt is stationary with one of said molds beneath said spout, a horizontal rotating wheel beneath said belt, means for raising it when a mold is above it and the belt is stationary, a shaping-tool above said belt and wheel, and transfer mechanism which lifts the molds from said belt and transfers them to another support.

9. In an apparatus for making saucers and the like, the combination of an intermittently-movable conveyer-belt having a plurality of holes through it, with absorbent molds which rest upon said belt and have cylindrical stems which pass through said holes and are rotatable therein, and mechanism which engages with said stems and lifts the molds clear of the belt and then rotates them.

In testimony whereof I hereunto affix my signature in the presence of two witnesses.

HARRY R. WYLLIE.

Witnesses:
 CALVIN RAYBURN,
 MARY McLAUGHLIN.